March 25, 1969  M. L. BENJAMIN ET AL  3,434,376
BORING BAR INSERT
Filed April 3, 1967  Sheet 1 of 3
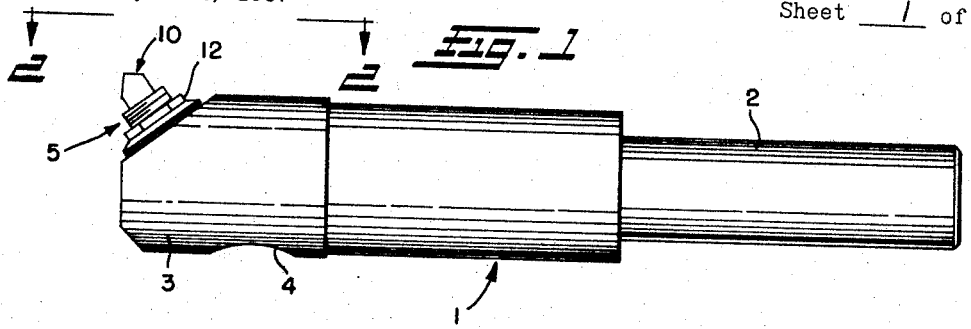
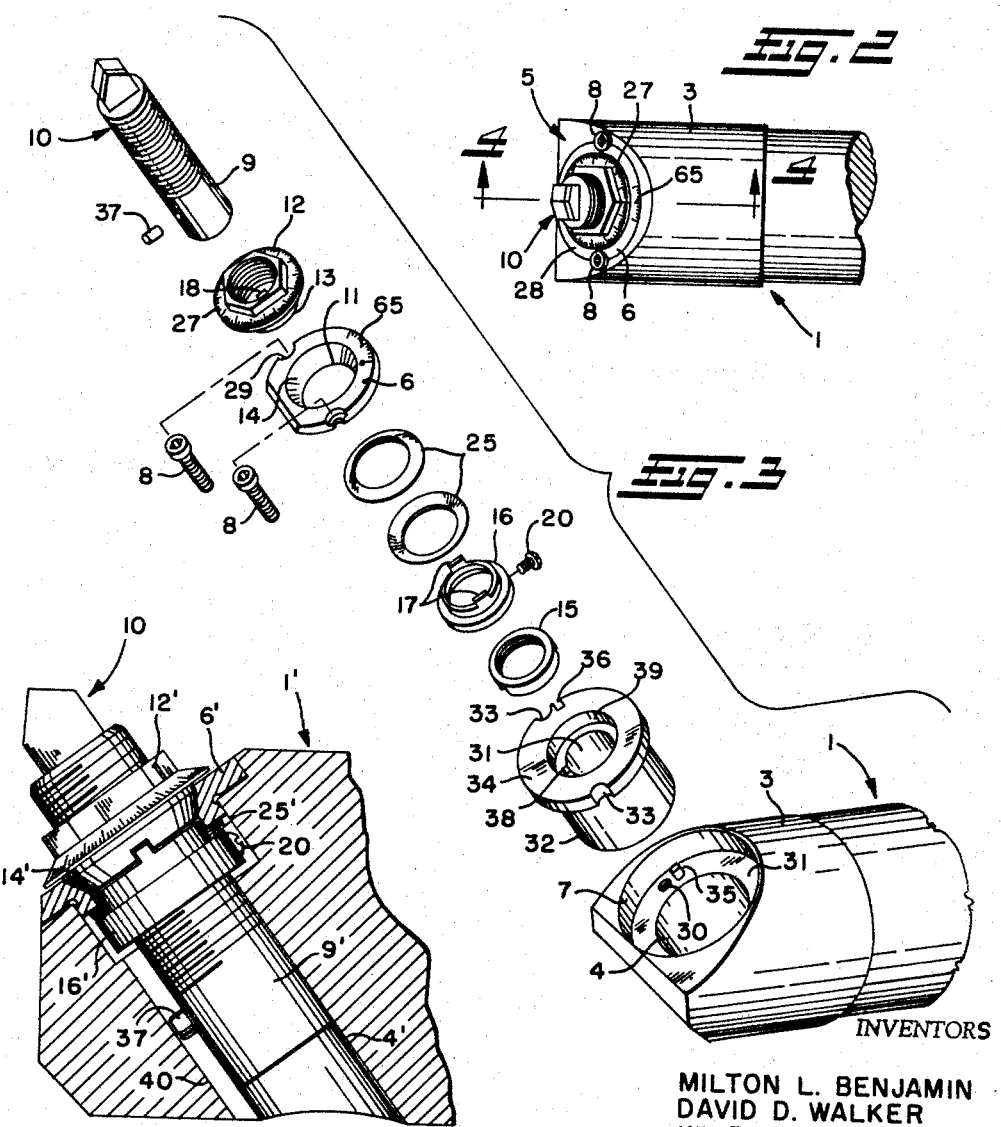
INVENTORS
MILTON L. BENJAMIN
DAVID D. WALKER
WILBUR N. MILES
BY
Oberlin, Maky, Donnelly & Renner
ATTORNEYS

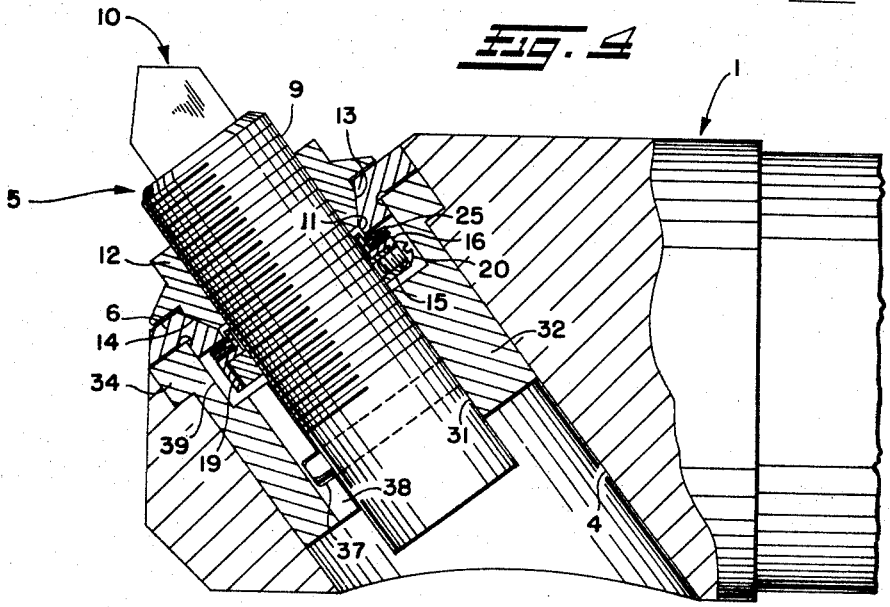
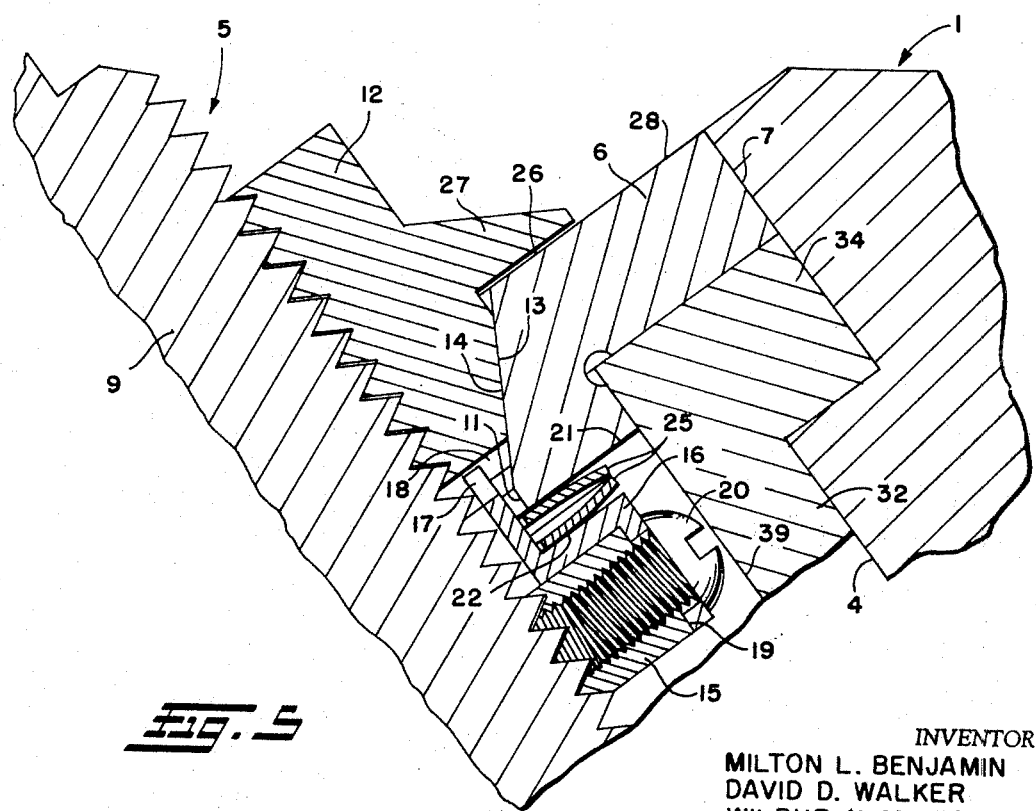

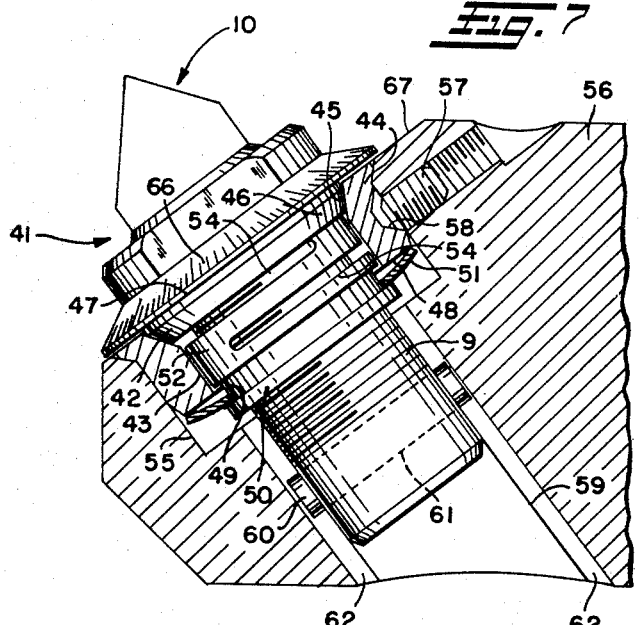
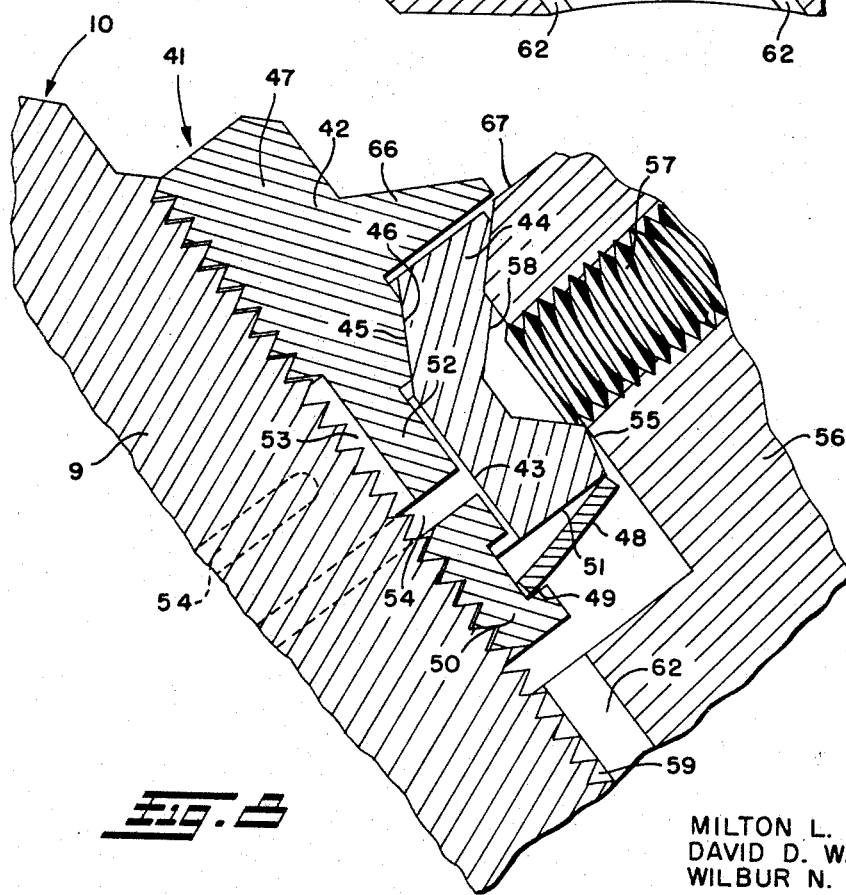

United States Patent Office 3,434,376
Patented Mar. 25, 1969

3,434,376
BORING BAR INSERT
Milton L. Benjamin, David D. Walker, and Wilbur N. Miles, Chagrin Falls, Ohio, assignors to Erickson Tool Company, Solon, Ohio, a corporation of Ohio
Filed Apr. 3, 1967, Ser. No. 628,083
Int. Cl. B23b 29/02
U.S. Cl. 77—58                                    20 Claims

ABSTRACT OF THE DISCLOSURE

A boring bar insert for adjustably holding a tool in selected positions in a boring bar. Rotation of a nut or bushing in threaded engagement with the tool shank causes inward and outward movement of the tool.

Background of the invention

The present invention relates generally as indicated to a boring bar insert and more particularly to certain improvements in boring bar inserts for providing accurate and quick adjustment of a tool bit within a boring bar.

In recent years several different types of boring bar inserts have been developed which are relatively simple in construction and yet are capable of extreme fineness of adjustment substantially unaffected by play between the cooperating threads thereof. An example of such inserts which has proven quite satisfactory in use may be found in the copending application of Milton L. Benjamin et al., Ser. No. 530,669 and now patent No. 3,313,187, filed Feb. 28, 1966, but it still requires the loosening of a locking device before tool adjustments can be made and the retightening of the locking device to securely hold the tool in the adjusted position, a task which is both a bother and time consuming.

Summary of the invention

With the boring bar insert of the present invention, a tool may be accurately adjusted both inwardly and outwardly simply by rotating a nut or bushing threadedly engaging the exposed end of the tool shank. In general, this is accomplished by providing a boring bar insert having a fixed ring through which the tool shank extends and a pair of axially spaced inner and outer nuts or sleeve portions disposed adjacent opposite sides of the fixed ring in threaded engagement with the tool shank. The inner and outer sleeve portions are interconnected against relative rotation but they are resiliently urged axially apart to eliminate axial play between the threads of the tool shank and sleeve portions and lock the sleeve portions against loosening under vibrations. Such resilient action also maintains the outer sleeve portion in proper seating engagement with the fixed ring despite wear between the mating parts of the boring bar insert.

It is accordingly a principal object of this invention to provide a novel boring bar insert of the type indicated which is of a simple construction and capable of very accurate inward and outward adjustment simply by rotating a nut or bushing in the desired direction.

Another object is to provide such an insert with novel means for maintaining the adjusting nut or bushing in proper mating engagement with the fixed ring, whereby the nut and thus the tool engaged thereby are accurately centered with respect to a bore in the fixed ring through which the tool extends.

Still another object is to provide such a boring bar insert with novel means for eliminating axial play between the inter-engaging threads of the adjusting nut or bushing and tool shank and locking the nut against loosening under vibrations.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

Brief description of the drawing

In such annexed drawing:

FIG. 1 is a top plan view of a boring bar of conventional type having one form of boring bar insert constructed in accordance with the present invention mounted therein;

FIG. 2 is a fragmentary end elevation view of the boring bar and insert of FIG. 1 as seen from the plane of the line 2—2 thereof;

FIG. 3 is an exploded perspective view showing the boring bar insert of FIG. 1 in disassembled form;

FIG. 4 is an enlarged fragmentary longitudinal section through the boring bar and insert taken on the plane of the line 4—4, FIG. 2;

FIG. 5 is a still further enlarged fragmentary section of a portion of the boring bar and insert of FIG. 4 to illustrate more clearly the novel manner in which axial and radial play between the various parts thereof is eliminated;

FIG. 6 is a plan view of another embodiment of boring bar insert in accordance with this invention mounted in a boring bar, shown in section;

FIG. 7 is an enlarged fragmentary longitudinal section of yet another embodiment of boring bar and insert in accordance with this invention; and FIG. 8 is a still further enlarged fragmentary section of the boring bar and insert of FIG. 7.

Description of the preferred embodiments

Referring now in detail to the drawing, there is shown in FIGS. 1–5 a boring bar 1 of conventional type having a reduced shank portion 2 at one end which may be secured to the spindle of a metal-working machine or the like in known manner. In the other end 3 is a transverse bore 4 for receipt of a boring bar insert 5 which may be constructed in accordance with this invention.

As best seen in FIGS. 3–5, the boring bar insert 5 may consist of a ring member 6 which is adapted to be mounted in a counterbore 7 in the boring bar 1 by suitable fasteners 8 in coaxial alignment with the bore 4 for insertion of the shank portion 9 of the tool bit 10 through the central opening 11 of the ring member 6 into the bore 4. An adjusting nut 12 in threaded engagement with the tool shank 9 has a frusto-conical inner end portion 13 which mates with a corresponding frusto-conical seat 14 in the ring member 6. Also threadedly engaging the shank portion 9 of the tool bit 10 adjacent the side of the ring member 6 opposite the adjusting nut 12 is a tension nut 15 which is adapted to be keyed to the adjusting nut 12 for rotation therewith as by means of a tubular sleeve 16 slidable on the shank portion 9 and having a pair of tangs 17 extending through the central opening 11 of the ring member 6 into slots 18 in the adjusting nut 12. The tension nut 15 is received in a counterbore 19 in the tubular sleeve 16 and secured in place by a set screw 20 extending through the tubular sleeve 16 into the tension nut 15.

Opposed annular shoulders 21 and 22 on the ring member 6 and tubular sleeve 16, respectively, are engaged by a pair of back-to-back Belleville springs 25 or the like which as clearly shown in FIG. 5 urge the nuts 12 and 15 axially apart thus eliminating any axial play that might be present between the threads of the tool shank 9 and nuts 12, 15 and providing frictional resistance against loosening of the nuts due to vibrations. At the same time, the spring force acting on the tension nut 15 is transmitted through the tool bit 10 to the adjusting nut 12 to maintain the same in firm seating engagement with the frusto-conical seat 14 of the ring member 6. Accordingly, should any wear take place between the contacting surfaces of the adjusting nut 12, ring member 6, springs 25, and sleeve 16 during use of the boring bar insert 5, the springs 25 will automatically take up any looseness between these parts which could permit axial and radial play between the adjusting nut 12 and ring member 6 and thus substantially affect the accuracy of tool adjustments. Although the use of two such Belleville springs 25 are shown, it should be understood that one or more springs may be provided depending upon the pressure required. A slight clearance 26 between the flange 27 on the adjusting nut 12 and the adjacent end face 28 of the ring member 6 assures proper seating engagement of the nut 12 against the seat 14.

The boring bar insert 5 thus assembled is ready for insertion into the bore 4 of the boring bar 1 as an assembly in the manner indicated in FIGS. 4 and 5 so that the ring member 6 is received in the counterbore 7 and secured in place by screws 8 engaging slots 29 in the ring member 6 and threaded into tapped openings 30 in the bottom wall 31 of the counterbore 7. The inner end of the tool bit 10 may have a close fit in the bore 31 of a bushing 32 (see especially FIG. 4) received in the bore 4 for guiding such tool bit during axial adjustments in a manner to be subsequently explained.

The bushing 32 is held against turning by the screws 8 which pass through slots 33 in a flange 34 of the bushing 32 that is received in the counterbore 7. In addition, a pin 35 may be provided on the counterbore wall 31 which projects into a slot 36 in the flange 34 as further assurance against turning.

The shank portion 9 of the tool bit 10 likewise has a pin 37 projecting therefrom into a longitudinal keyway 38 in the bushing 32 for holding the tool bit against turning during machining operations. A counterbore 39 in the outer end of the bushing 32 receives the shoulder portion 21 of the ring member 6, Belleville springs 25, tubular sleeve 16, and tension nut 15 with sufficient radial clearance to permit rotation of the springs 25, tubular sleeve 16, and nut 15 therewithin during tool adjustments.

Alternatively, the bushing 32 may be eliminated altogether as in the FIG. 6 embodiment and the tool bit 10 keyed directly to the wall of the bore 4' as by means of the pin 37 extending into a longitudinal keyway 40 in the wall of such bore. The nut 12 and 12' engaging the seat 14 or 14' will provide considerable support for guiding the tool bit 10 during adjustments, but it is desirable that the bushing 32 of the FIGS. 1–5 embodiment and the bore 4' of the FIG. 6 embodiment be stepped as shown to establish a close sliding fit with the tool shank for additional support. Otherwise, the structure and operation of the boring bar insert 5' of FIG. 6 is substantially the same as that shown in FIGS. 1–5 and accordingly no further discussion of the same is thought to be necessary.

In FIGS. 7 and 8 there is illustrated an even more simplified form of boring bar insert 41 in which a one-piece bushing 42 has been substituted for the nuts 12 and 15 of the FIGS. 1 and 6 embodiments, thus eliminating the need for the tubular sleeve 16 which interconnects the nuts together as previously described. The bushing 42 is adapted to be received in the bore 43 of a ring member 44 which like the ring member 6 has a frusto-conical seat 45 for engagement by a correspondingly tapered shoulder 46 on the outer end portion 47 of the bushing 42. A Belleville spring washer 48 or the like which may be split to facilitate assembly into an outer annular groove 49 on the inner end portion 50 of the bushing 42 contacts the inner end 51 of the ring member 44 to maintain such bushing and ring member in firm seating engagement with each other.

The inner and outer end portions 50, 47 of the bushing 42 are internally threaded for threaded engagement with the tool shank 9, while the intermediate portion 52 of the bushing 42 which interconnects the inner and outer end portions 50, 47 is undercut to provide a clearance 53 with the tool shank 9. Also formed in the intermediate portion 52 are a plurality of transverse slots 54 which are circumferentially offset to provide a yieldable connection between the inner and outer end portions 50, 47. When two such slots 54 are provided as shown, they are desirably circumferentially offset 180° from each other so as to permit limited relative movement of the inner and outer end portions 50, 47 in an axial direction while providing a substantially rigid connection in a radial or lateral direction. Thus, the spring washer 48, in addition to maintaining the bushing 42 and ring member 44 in firm seating engagement with each other, will urge the inner and outer end portions 47, 50 axially apart due to the axially yieldable intermediate portion 52, whereby axial play between the threads of the tool shank 9 and inner and outer end portions 50, 47 is eliminated and there is frictional resistance precluding loosening of the bushing except when a positive turning force is applied thereto.

Such axial play may also be eliminated by slightly compressing the bushing 42 during formation of the internal threads on the inner and outer end portions 50, 47 so that the threads on the inner end portion are out of line with those on the outer end portion. This will make it necessary to compress the bushing to the same extent before it can be threaded onto the tool shank 9. With the intermediate portion 52 in compression, the inner and outer end portions 50, 47 are urged apart much in the same manner as they are by the action of the spring washer 48, whereby the spring washer 48 need only be strong enough to maintain the bushing 42 in proper seating engagement with the ring member 44 or it may be stronger to supplement the force exerted by the compressed intermediate portion 52. Substantially the same results can be obtained by expanding the bushing during formation of the threads, but in that case the spring 48 will be acting against the force exerted by the expanded intermediate portion 52 urging the inner and outer end portions 50, 47 toward each other.

The bushing 42 performs another important function. Because the intermediate portion 52 is substantially rigid in a radial direction as aforesaid, such bushing throughout its entire length will tend to maintain the tool bit 10 in true coaxial alignment with respect to the seat 45 in the ring member 44.

With the boring bar insert 41 assembled on the tool shank 9 as just described, the entire assembly may be inserted into a counterbore 55 in the boring bar 56 and secured in place by one or more set screws 57 which when tightened extend into recesses 58 in the outer surface of the ring member 44. When the parts are thus assembled, the inner end of the tool bit 10 extends into the bore 59 in close sliding engagement therewith to provide additional support. A pin 60 press fitted in a crossbore 61 in the tool bit 10 has its ends extending into longitudinal keyways 62 in the wall of the bore 59 to lock the tool bit against turning.

Whether the boring bar insert 5 or 41 is used, adjustment of the length of the tool bit 10 for making a greater or lesser cut of a workpiece is accomplished in both cases simply by rotating one element; namely, the adjusting nut 12 of the boring bar insert 5 and the outer end portion 47 of the boring bar insert 41 which may have a hexagonal or other such configuration to facilitate gripping by a wrench or the like. The extent of such tool adjustment is determined in the case of the boring bar insert 5 by measuring the amount of rotation of the graduated nut flange 27 with respect to graduations 65 on the end face 28 of the ring member 6, and in the case of the boring bar insert 41 by similarly measuring the amount of rotation of a graduated flange 66 on the outer end portion 47 of the bushing 42 with respect to graduations on the end face 67 of the boring bar 56. As apparent, the number of threads per inch on the tool bit 10 may be varied to achieve the desired amount of tool bit advance per revolution of adjusting nut 12 and bushing 42.

During such tool adjustment, the springs 25 of the boring bar insert 5 maintain the nuts 12 and 15 urged apart while the spring washer 48 and/or the compressed intermediate portion 52 of the boring bar insert 41 maintain the inner and outer threaded end portions 50, 47 of the bushing 42 urged apart thus eliminating axial play between the mating threads of the tool bit 10 and nuts or bushing, whereby should there be slight clearance between the mating threads, it will not affect the accuracy of adjustment of the tool bit 10 in either direction. Moreover, the adjusting nut 12 and bushing 42 will remain in proper seating engagement with their respective ring members 6 and 44 despite wear of the parts during use thus eliminating both radial and axial play therebetween which could also affect the accuracy of adjustment of the tool bit, and the frictional contact between the threads is sufficient to prevent rotation of the adjusting nut 12 and bushing 42 except when a positive turning force is applied thereto.

No loosening or tightening of screws of any kind is required to make tool adjustments; it is only necessary to turn an external nut or bushing. Accordingly, there is no need for access to the inner end of the boring bar insert and thus the bore in the boring bar which receives the boring bar insert need not extend all the way through the bar and could even be axially disposed if desired.

The boring bar 5 or 41 may also be easily removed from the boring bar for replacement of the tool bit 10 when required simply by loosening of the screw 8 or 57 and withdrawing the boring bar insert as a unit, after which the parts may be disassembled from the shank portion 9 and the tool replaced.

It can now be seen that the various forms of boring bar inserts of the present invention are of a simple and unique construction which permit ready and accurate adjustment of the tool bit contained therein simply by rotating an adjusting nut or bushing threadedly engaging the tool shank. Moreover, it is a simple matter to replace the tool bit when required, since the boring bar insert is held in place only by a set screw or the like.

Other modes of applying the principles of the invention may be employed, change being made as regards the details described, provided the features stated in any of the following claims or the equivalent of such be employed.

We, therefore, particularly point out and distinctly claim as our invention:

1. In combination, a shank portion, a pair of sleeve portions in threaded engagement with said shank portion, means interconnecting said sleeve portions for rotation as a unit, and means for urging said sleeve portions axially apart to eliminate axial play between the mating threads of said shank portion and sleeve portions and provide resistance to loosening of said sleeve portions due to vibrations and the like.

2. A combination according to claim 1 wherein said sleeve portions are nut members in threaded engagement with said shank portion, and said means interconnecting said nut members for rotation together comprises a tubular sleeve fixed to one of said nut members, said tubular sleeve having tangs extending therefrom into slots in the other nut member.

3. A combination according to claim 1 wherein said last-mentioned means comprises spring means interposed between said sleeve portions for urging said sleeve portions axially apart as aforesaid.

4. In combination, a shank portion, a bushing comprising inner and outer end portions in threaded engagement with said shank portion, and an intermediate portion integral with said inner and outer end portions, said intermediate portion having an inner diameter greater than the diameter of said shank portion to provide a clearance therebetween and having transverse slots therein which provide a yieldable connection between said inner and outer end portions, and means for urging said inner and outer end portions axially apart to eliminate axial play between the mating threads of said shank portion and end portions and provide resistance to loosening of said end portions due to vibrations and the like.

5. In combination with a tool having a shank portion, a boring bar insert comprising a ring member having an opening through which said shank portion extends, inner and outer sleeve portions in threaded engagement with said shank portion adjacent opposite sides of said ring member, means interconnecting said inner and outer sleeve portions for rotation of said inner sleeve portion with said outer sleeve portion, and spring means interposed between said inner and outer sleeve portions for urging said sleeve portions axially apart to eliminate axial play between the mating threads of said shank portion and sleeve portions.

6. A combination according to claim 5 wherein said spring means is interposed between said ring member and inner sleeve portion for urging said tool in a direction maintaining said outer sleeve portion in seating engagement with said ring member.

7. A combination according to claim 5 wherein said inner and outer sleeve portions are nut members and said means interconnecting said inner and outer nut members for rotation together comprises a tubular sleeve fixed to said inner nut member, said tubular sleeve having tangs extending through said opening in said ring member and received in slots in said outer nut member.

8. A combination according to claim 5 wherein said ring member has a tapered seat for engagement by a correspondingly tapered portion on said outer sleeve portion, said spring means being interposed between said ring member and inner sleeve portion for urging said sleeve portions exially apart to eliminate axial play between the mating threads thereof as aforesaid, prevent loosening of said sleeve portions due to vibrations and the like, and maintain said outer sleeve portion in firm seating engagement with said seat for accurate alignment of said tool with said opening in said ring member.

9. In combination with a tool having a shank portion, a boring bar insert comprising a ring member having an opening through which said shank portion extends, a bushing comprising inner and outer end portions in threaded engagement with said shank portion, and an intermediate portion integral with said inner and outer end portions, said intemediate portion having an inner diameter greater than the diameter of said shank portion to provide a clearance therebetween and having transverse slots therein which provide a yieldable connection between said inner and outer end portions, and means for urging said inner and outer end portions axially apart to eliminate axial play between the mating threads of said shank portion and end portions and provide resistance to loosening of said end portions due to vibrations and the like.

10. A combination according to claim 9 wherein said transverse slots are circumferentially offset from each other to provide a substantially rigid connection in a radial direction for maintaining said tool in true coaxial alignment with said ring member.

11. In combination, a boring bar having a bore therein and a boring bar insert adjustably mounting a tool in said bore, said boring bar insert comprising a ring member fixed to said boring bar and having an opening therethrough in axial alignment with said bore in said boring bar, said tool having a shank portion extending through said opening into said bore, inner and outer sleeve portions in threaded engagement with said shank portion adjacent opposite sides of said ring member, means interconnecting said inner and outer sleeve portions for rotation as a unit, and means for keying said shank portion against rotation, whereby rotation of said outer sleeve portion in opposite directions causes corresponding inward and outward movement of said tool in said bore.

12. A combination according to claim 11 further comprising spring means interposed between said inner and outer sleeve portions for urging said sleeve portions axially apart to eliminate axial play between the threads of said tool shank and sleeve portions.

13. A combination according to claim 12 wherein said spring means is interposed between said ring member and said inner sleeve portion for urging said tool axially inwardly, whereby said outer sleeve portion is held in seating engagement with said ring member.

14. A combination according to claim 11 wherein said inner and outer sleeve portions are nut members and said means interconnecting said inner and outer nut members for rotation together comprises a tubular sleeve fixed to said inner nut member, said tubular sleeve having tangs extending through said opening in said ring member and received in slots in said outer nut member.

15. A combination according to claim 14 wherein said tubular sleeve has a counterbore therein for receipt of said iner nut member, and there is a set screw extending through said tubular sleeve into said inner nut member for locking said sleeve and inner nut member together.

16. A combination according to claim 11 wherein said ring member has a tapered seat for engagement by a correspondingly tapered portion on said outer sleeve portion, and spring means are interposed between said ring member and inner sleeve portion for urging said sleeve portions axially apart to eliminate axial play between the mating threads of said tool shank and sleeve portions, prevent loosening of said sleeve portions due to vibrations, and maintain said outer sleeve portion in firm seating engagement with said seat for accurate alignment of said tool with said opening in said ring member.

17. A combination according to claim 16 wherein said shank portion inwardly of said inner sleeve portion has a close sliding fit with said bore to provide additional support for said tool.

18. A combination according to claim 16 further comprising a bushing fixed in the bore of said boring bar, said bushing having a longitudinal bore in which the inner end of said tool is closely slidably received to provide additional support for said tool.

19. A combination according to claim 11 wherein said means interconnecting said inner and outer sleeve portions for rotation as a unit comprises an intermediate sleeve portions, said intermediate sleeve portion having an inner diameter slightly greater than the diameter of said shank portion to provide a clearance therebetween, and transverse slots in said intermediate sleeve portion which provide a yieldable connection between said inner and outer end portions, and means for urging said inner and outer end portions axially apart to eliminate axial play between the mating threads of said shank portion and end portions and provide resistance to loosening of said end portions due to vibrations and the like.

20. A combination according to claim 19 wherein there are two of said transverse slots circumferentially offset 180° from each other so as to permit limited relative movement of said inner and outer sleeve portions in an axial direction while providing a substantially rigid connection in a radial directon.

References Cited

UNITED STATES PATENTS

| | | | |
|---|---|---|---|
| 3,116,653 | 1/1964 | Lombardo | 77—58 |
| 3,178,969 | 4/1965 | Yogus et al. | 77—58 |
| 3,313,187 | 4/1967 | Benjamin et al. | 77—58 |
| 3,349,648 | 10/1967 | Halloway | 77—58 |

GERALD A. DOST, *Primary Examiner.*